(12) United States Patent
Nelson

(10) Patent No.: US 9,162,626 B1
(45) Date of Patent: Oct. 20, 2015

(54) OUTDOOR COOKING ASSEMBLY

(76) Inventor: Aaron D. Nelson, Susanville, CA (US)

(*) Notice: Subject to any disclaimer, the term of this patent is extended or adjusted under 35 U.S.C. 154(b) by 691 days.

(21) Appl. No.: 13/426,245

(22) Filed: Mar. 21, 2012

(51) Int. Cl.
*B60R 7/00* (2006.01)
*F24C 15/00* (2006.01)
*B60R 9/00* (2006.01)
*B62D 33/08* (2006.01)
*B62D 25/00* (2006.01)

(52) U.S. Cl.
CPC ... *B60R 7/00* (2013.01); *B60R 9/00* (2013.01); *B62D 33/08* (2013.01); *F24C 15/00* (2013.01); *B62D 25/00* (2013.01)

(58) Field of Classification Search
CPC .............................. B60H 1/00364; B60R 7/00
See application file for complete search history.

(56) References Cited

U.S. PATENT DOCUMENTS

| | | | |
|---|---|---|---|
| 1,338,027 A * | 4/1920 | Lindberg | 49/103 |
| 3,630,189 A * | 12/1971 | Hodges et al. | 126/41 R |
| 4,518,189 A | 5/1985 | Belt | |
| 5,320,397 A * | 6/1994 | Peterson et al. | 296/57.1 |
| 5,640,949 A | 6/1997 | Smith | |
| 6,101,773 A * | 8/2000 | Chau et al. | 52/220.7 |
| 6,354,286 B1 | 3/2002 | Davis | |
| 6,371,105 B1 * | 4/2002 | Merritt | 126/42 |
| 6,520,473 B2 | 2/2003 | Lee | |
| 6,588,418 B1 | 7/2003 | Loving | |
| 6,877,505 B1 | 4/2005 | Den Hoed | |
| D566,631 S | 4/2008 | Shahan | |
| 2007/0006867 A1 * | 1/2007 | Karney et al. | 126/37 B |
| 2008/0190977 A1 * | 8/2008 | Estabrook | 224/404 |

* cited by examiner

*Primary Examiner* — Steven B McAllister
*Assistant Examiner* — Rabeeul Zuberi

(57) ABSTRACT

An outdoor cooking assembly includes a pickup truck including a box that has a basal wall and an exterior wall that is attached to and extends vertically from the basal wall. A gate has a top wall, a bottom wall and a perimeter wall extending between the top and bottom walls. The gate is selectively positionable in a closed position to close the opening. The gate is selectively positionable in an open position to expose the opening and has the top wall in a generally horizontal orientation. The top wall has a cooking aperture extending therethrough. A pan is positioned within the interior of the gate and is accessible through the cooking aperture. A burner is positioned in the pan. A control valve is in fluid communication with the burner and the control valve is configured to be fluidly coupled to a fuel supply for supplying fuel to the burner.

1 Claim, 8 Drawing Sheets

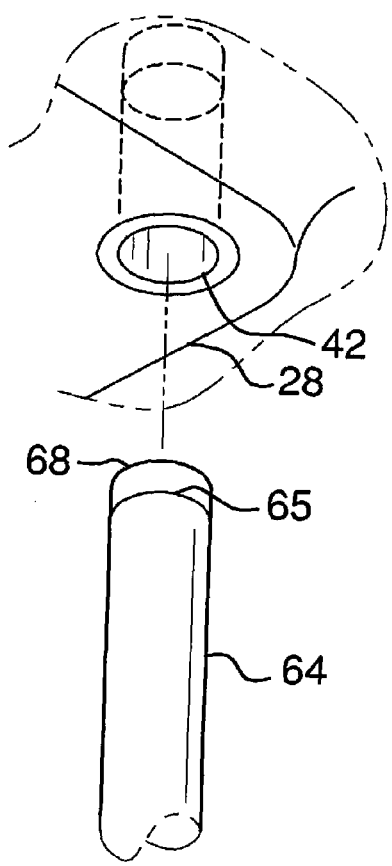
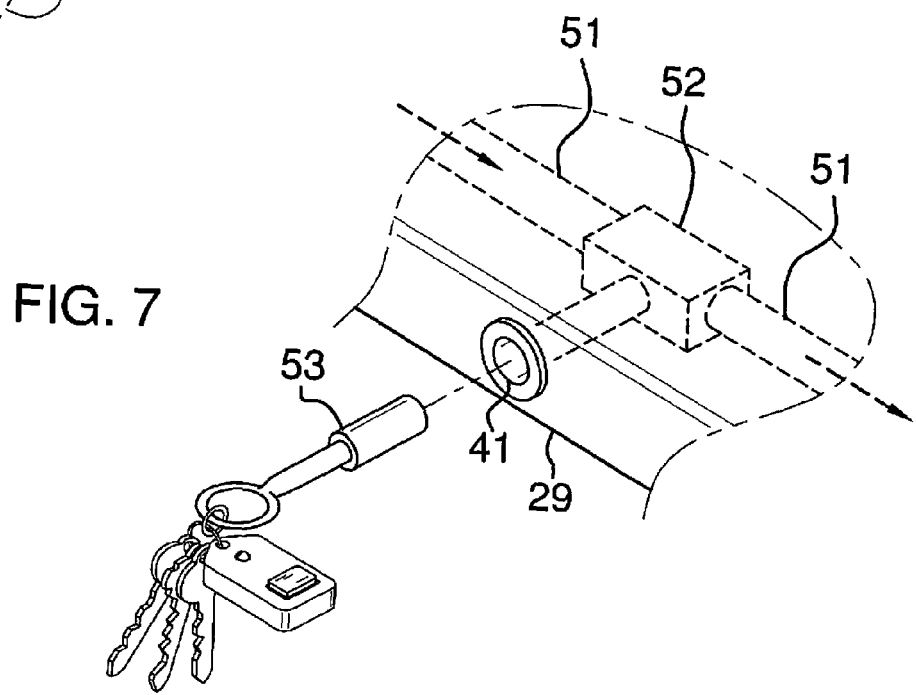
FIG. 6
FIG. 7

OUTDOOR COOKING ASSEMBLY

BACKGROUND OF THE DISCLOSURE

Field of the Disclosure

The disclosure relates to outdoor cooking devices and more particularly pertains to a new outdoor cooking device for cooking on a vehicle.

SUMMARY OF THE DISCLOSURE

An embodiment of the disclosure meets the needs presented above by generally comprising a pickup truck including a box that has a basal wall and an exterior wall that is attached to and extends vertically from the basal wall. The exterior wall includes a first lateral wall, a second lateral wall and a cab wall. An end of each of the first and second lateral walls defines an opening on a rear end of the box. A gate has a top wall, a bottom wall and a perimeter wall extending between the top and bottom walls. The gate is rotatably coupled to each of the first and second lateral walls. The gate is selectively positionable in a closed position to close the opening. The gate is selectively positionable in an open position to expose the opening and has the top wall in a generally horizontal orientation. The top wall has a cooking aperture extending therethrough to access an interior of the gate. A pan is positioned within the interior of the gate and is accessible through the cooking aperture. A burner is positioned in the pan. A control valve is in fluid communication with the burner and the control valve is configured to be fluidly coupled to a fuel supply for supplying fuel to the burner. A grill is removably positioned over and completely covers the cooking aperture to provide a cooking surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 6 is a bottom side cut-away view of an embodiment of the disclosure.

FIG. 7 is a front side cut-away view of an embodiment of the disclosure.

DESCRIPTION OF THE PREFERRED EMBODIMENT

Figure 1:
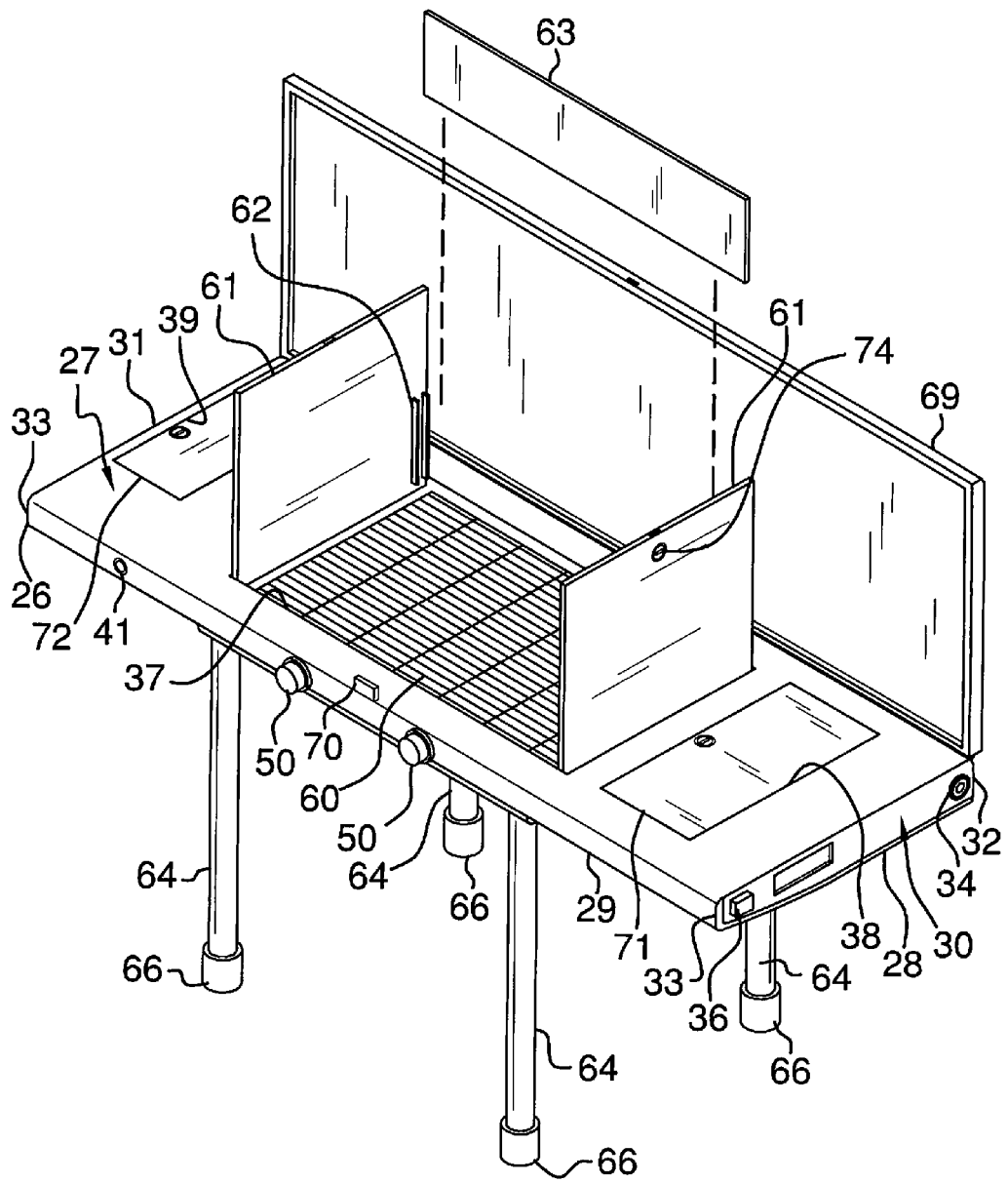
FIG. 1 is a right side perspective view of an outdoor cooking assembly according to an embodiment of the disclosure.

With reference now to the drawings, and in particular to FIGS. 1 through 9 thereof, a new outdoor cooking device embodying the principles and concepts of an embodiment of the disclosure and generally designated by the reference numeral 10 will be described.

As best illustrated in FIGS. 1 through 9, the outdoor cooking assembly 10 generally comprises a pickup truck 11 including a box 12 that has a basal wall 13 and an exterior wall 14 that is attached to and extends vertically from the basal wall 13. The exterior wall 14 includes a first lateral wall 15, a second lateral wall 16 and a cab wall 17. An end 18 of each of the first 15 and second 16 lateral walls defines an opening 19 on a rear end 20 of the box 12. The box 12 may be of any conventional design.

The end 18 of each of the first 15 and second 16 lateral walls may include a channel 21 that extends vertically from a top edge 22 to a bottom edge 23 of each of the first 15 and second 16 lateral walls. A receiver 24 may be positioned in each of the channels 21 adjacent to the bottom edge 23. A latch retainer 25 may be positioned in each of the channels 21 nearer to the top edge 22 than the bottom edge 23.

A gate 26 has a top wall 27, a bottom wall 28 and a perimeter wall 29 extending between the top 27 and bottom 28 walls. The perimeter wall 29 includes a first side 30 and a second side 31, and each of the first 30 and second 31 sides includes an attaching end 32 and a free end 33. A pair of gate mounts 34 may each be attached to a corresponding one of the attaching ends 32 to each rotatably engage a corresponding one of the receivers 24.

Figure 2:
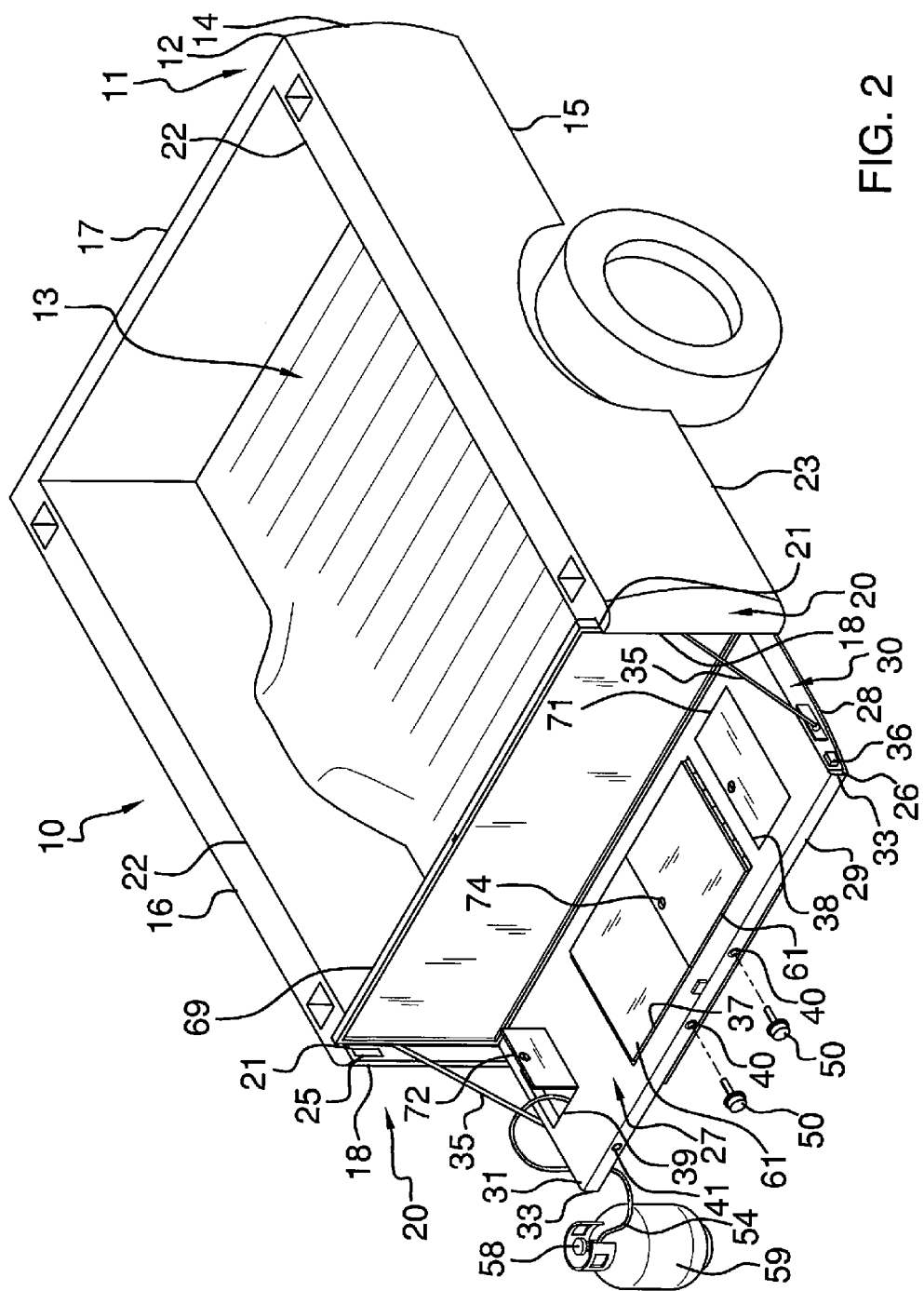
FIG. 2 is a right side perspective in-use view of an embodiment of the disclosure.
Figure 3:
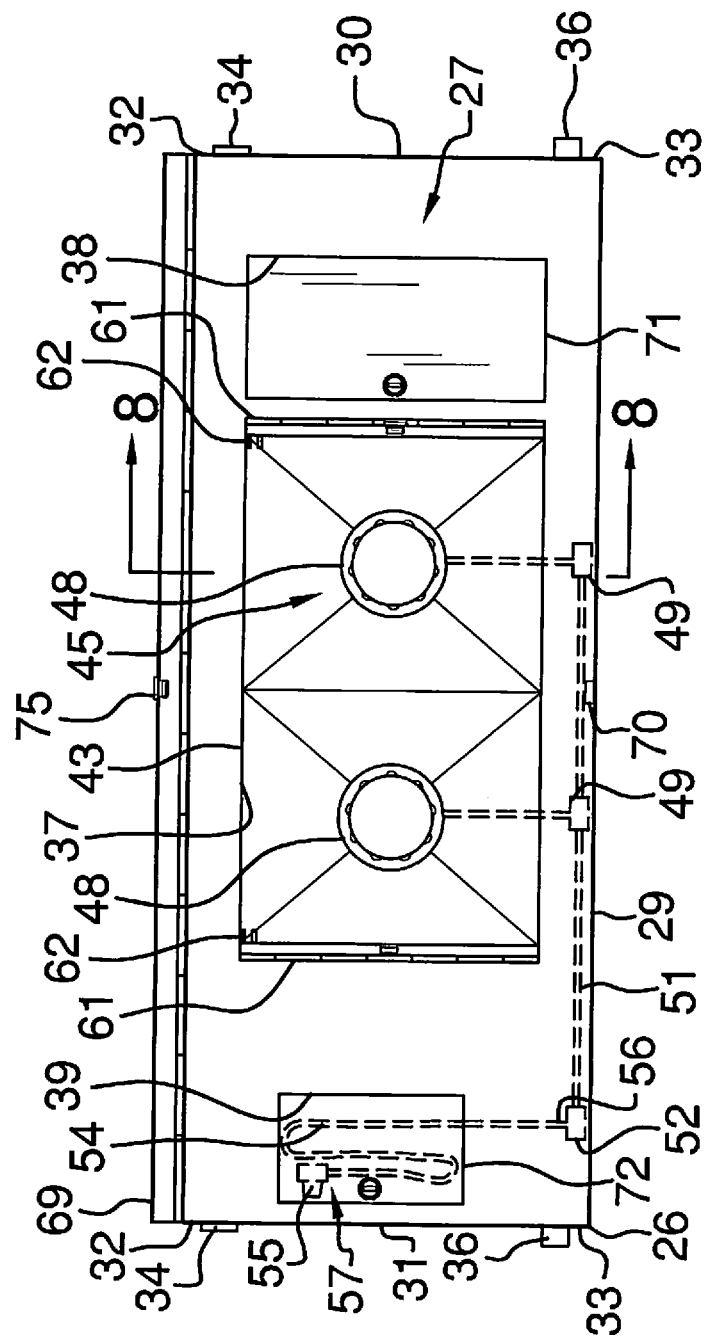
FIG. 3 is a top side view of an embodiment of the disclosure.
Figure 4:
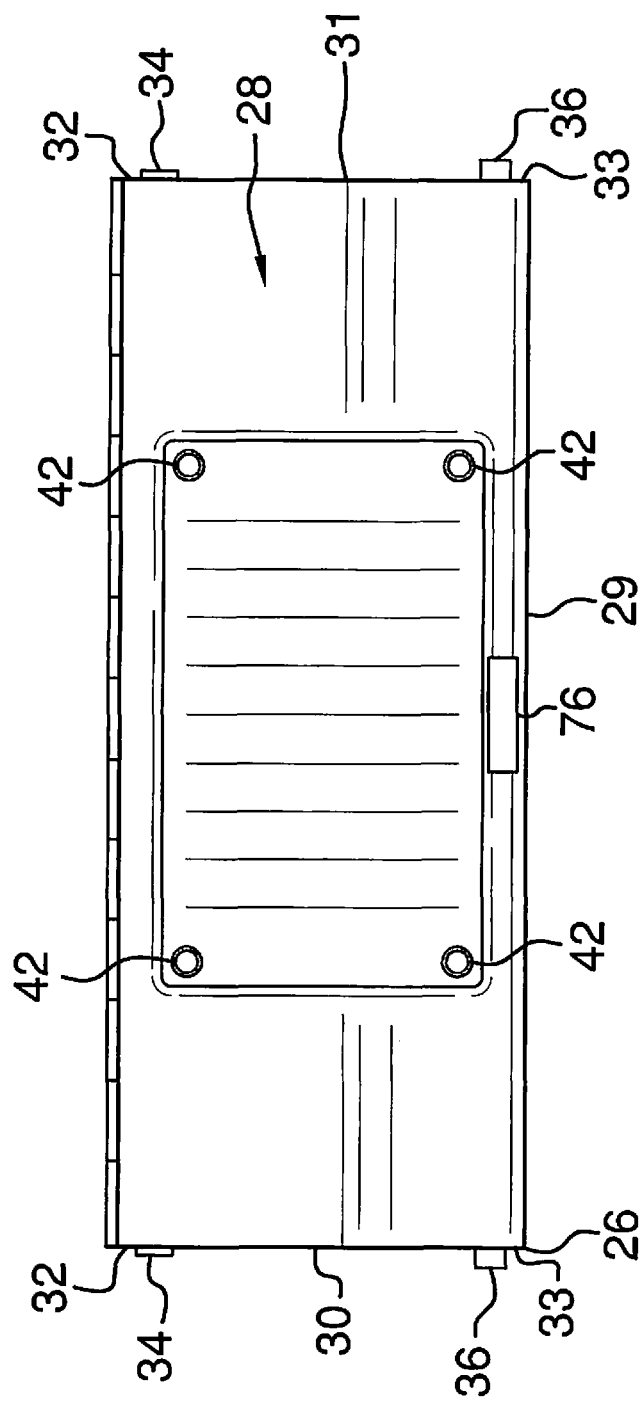
FIG. 4 is a bottom side view of an embodiment of the disclosure.
Figure 5:
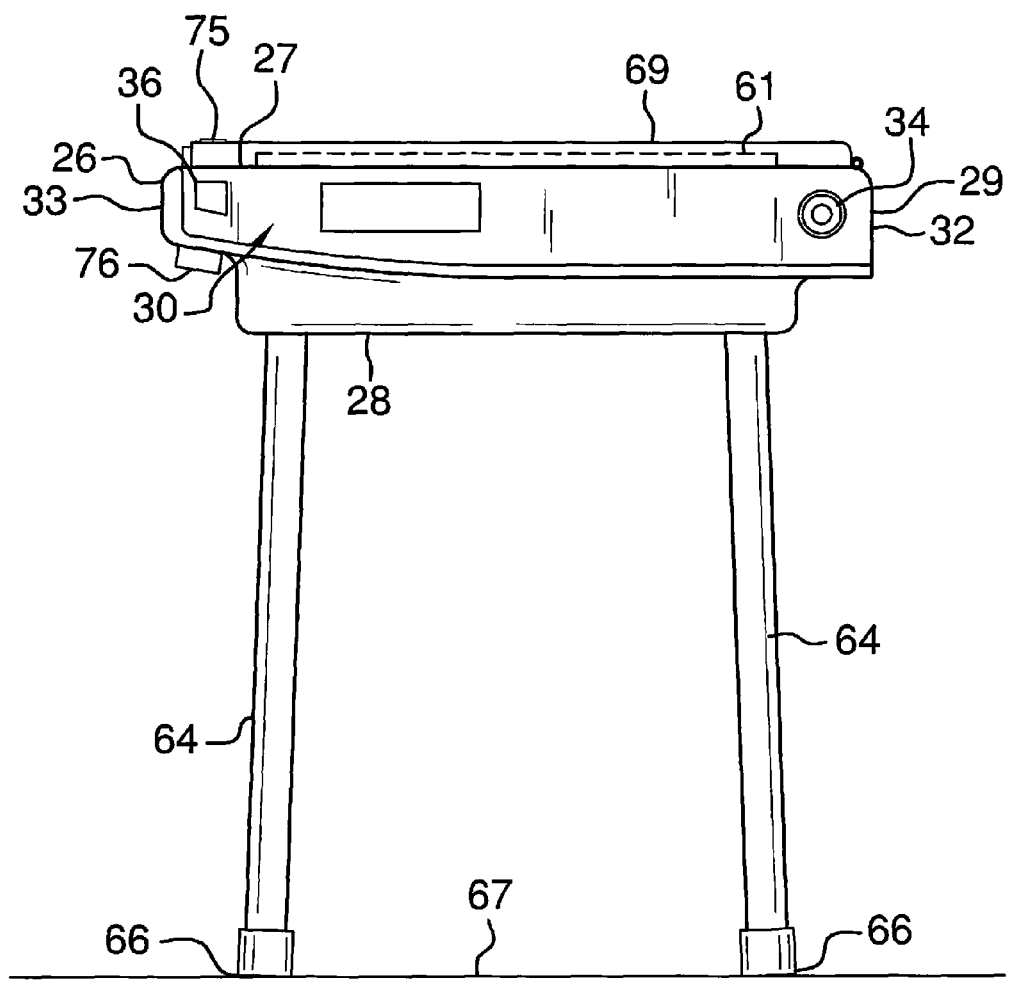
FIG. 5 is a right side view of an embodiment of the disclosure.
Figure 8:
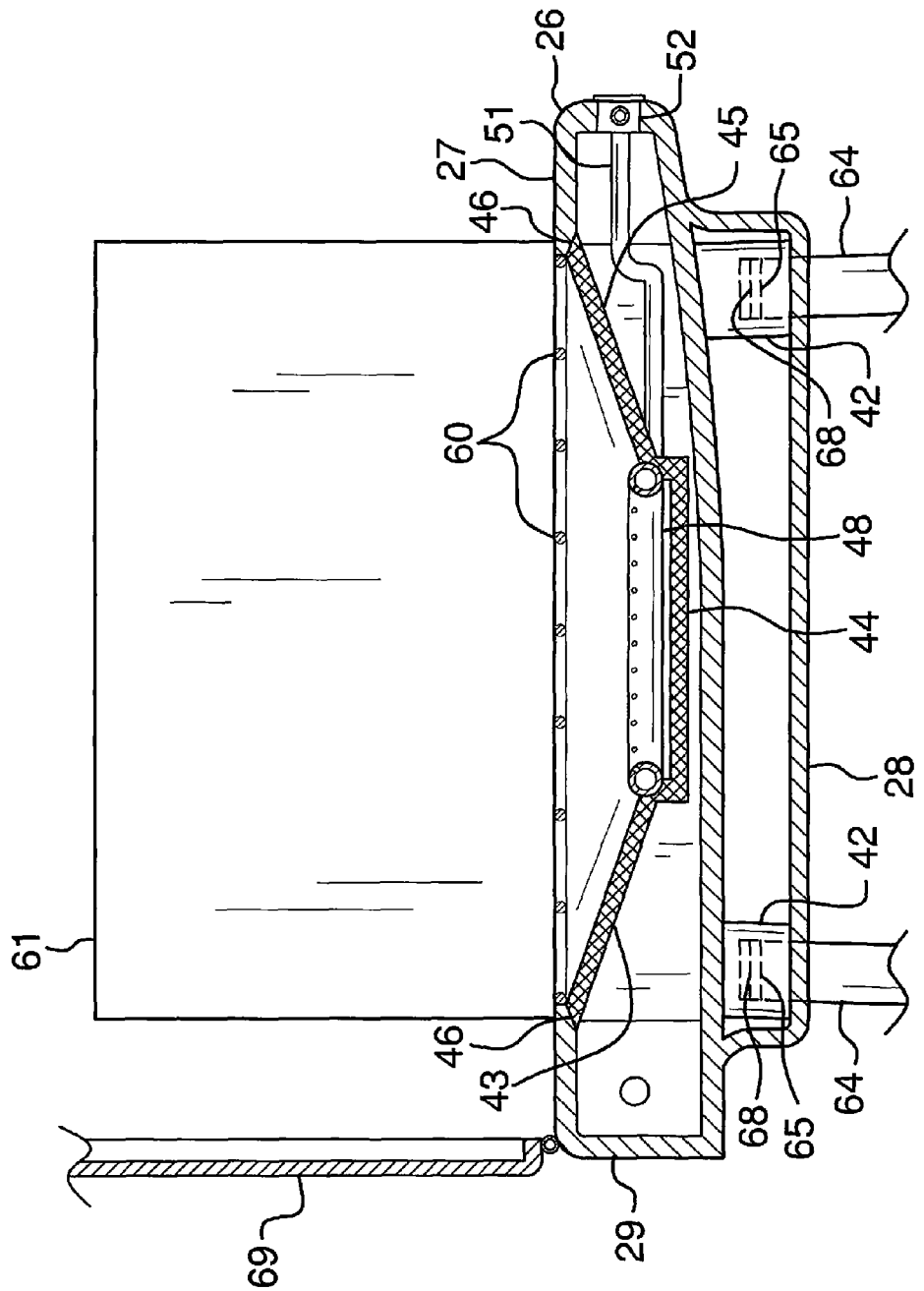
FIG. 8 is a cross sectional view taken along line 8-8 of FIG. 3 of an embodiment of the disclosure.
Figure 9:
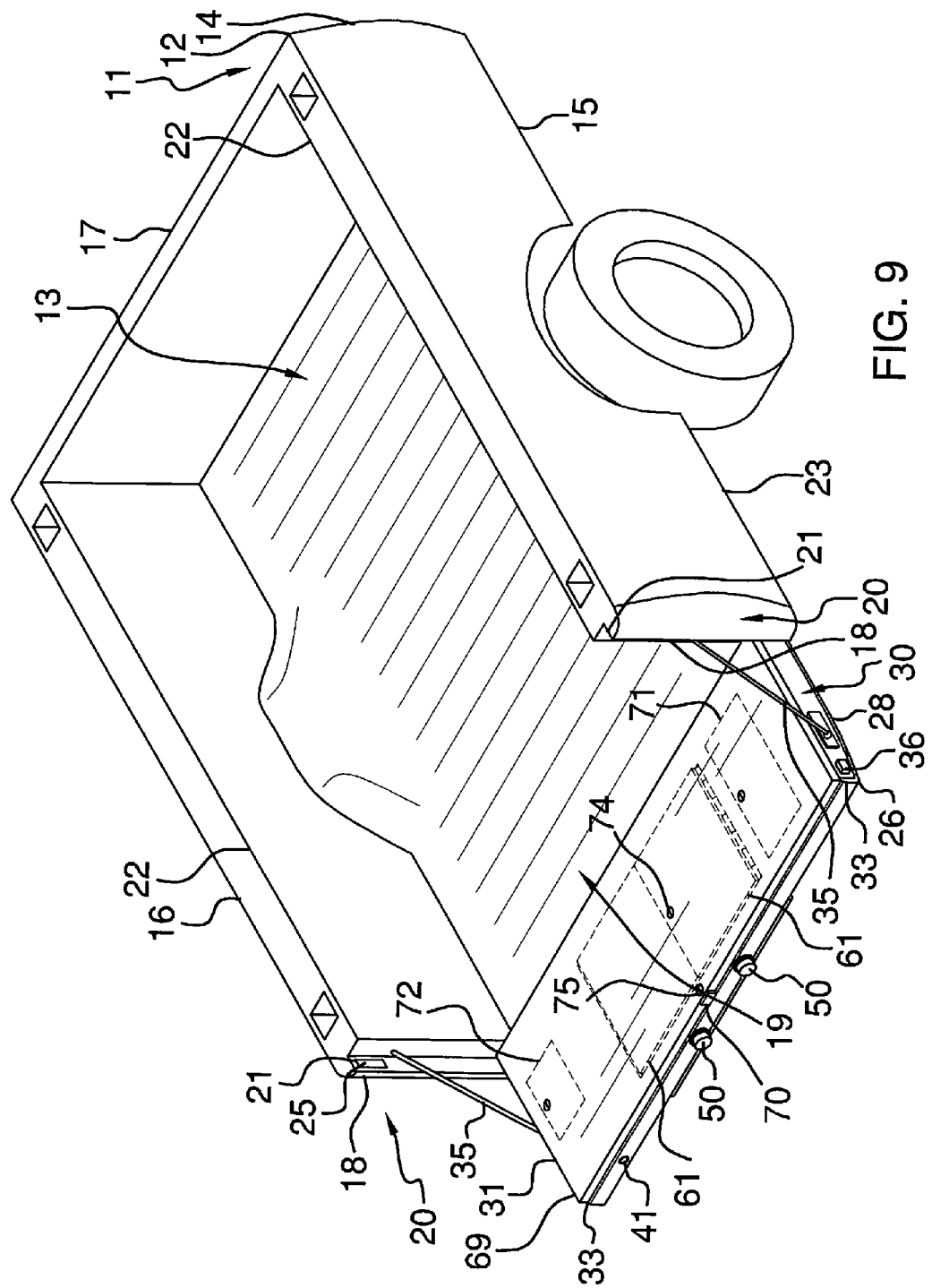
FIG. 9 is a right side perspective in-use view of an embodiment of the disclosure.

As illustrated in FIGS. 2 and 9, generally, the gate 26 is selectively positionable in an open position to expose the opening 19 with top wall 27 extending rearwardly from the box 12 in a generally horizontal orientation. The gate 26 is selectively positionable in a closed position to close the opening 19. A pair of supports 35 may extend between each of the first 30 and second 31 sides and a corresponding one of the first 15 and second 16 lateral walls to support the gate 26 in the open position. A pair of latches 36 is each attached to a corresponding one of the first 15 and second 16 lateral walls adjacent to each of the free ends 33. The latches 36 may each mechanically engage one of the latch retainers 25 to retain the gate 26 in the closed position.

The top wall 27 has a cooking aperture 37 extending therethrough to access an interior of the gate 26. The top wall 27 may have an access aperture 38 extending therethrough. The top wall 27 may have hose aperture 39 extending therethrough. The perimeter wall 29 may have a control aperture 40 extending therethrough. The perimeter wall 29 may have a valve aperture 41 extending therethrough. The bottom wall 28 has a plurality of leg wells 42 extending into the interior of the gate 26.

A pan 43 is positioned within the interior of the gate 26. The pan 43 has a lower wall 44 and a peripheral wall 45 that is attached to and extends upwardly from the lower wall 44. The peripheral wall 45 includes an upper edge 46. The upper edge 46 is attached to and is coextensive with an edge of the cooking aperture 37. The pan 43 may be comprised of a rigid and heat resistant material.

At least one burner 48 is positioned in the pan 43. The burner 48 may be of any conventional design. At least one control valve 49 is in fluid communication with the burner 48. The control valve 49 is configured to be fluidly coupled to a fuel supply for supplying fuel to the burner 48. The control valve 49 is positioned in the interior of the gate 26 and includes a removable grip 50 that is accessible through the control aperture 40.

The control valve 49 is actuated to control fuel flow to the burner. A fuel conduit 51 is in fluid communication with the control valve 49 and supplies fuel to the burner 48 when the control valve 49 is actuated to an open position. The control valve 49 restricts the flow of fuel to the burner 48 when the control valve 49 is actuated to a closed position. The control valve 49 may be actuated to selectively establish the flow of fuel to the burner 48 between a minimum and a maximum rate.

A shutoff valve 52 is in fluid communication with the fuel conduit 51. The shutoff valve 52 is positionable in an off position to restrict flow of fuel to the control valve 49 or in an open position to allow flow of fuel to the control valve 49. The shutoff valve 52 is positioned within the interior of the gate and is accessible through the valve aperture 41. A tool 53 is provided to selectively engage the shutoff valve 52 to position the shutoff valve 52 in the off position or the one position.

A hose 54 is in fluid communication with the shutoff valve 52. The hose 54 has a first end 55 and a second end 56. The first end 55 comprises a coupler 57 and the second end 56 is attached to the shutoff valve 52. The hose 54 may be extendable out of the hose aperture 39 and may be selectively connected to and may be in fluid communication with an outlet 58 of a fuel container 59 to supply the fuel to the burner 48. The hose 54 may be comprised of a flexible material.

A grill 60 is removably positioned over and completely covers the cooking aperture 37 to provide a cooking surface. The grill 60 may be of any conventional design. A pair of doors 61 each is hingedly coupled to the top wall 27. Each of the doors 61 is selectively positionable to close the cooking aperture 37. Each of the doors 61 is selectively positionable to expose the cooking aperture 37 so that each of the doors 61 extends vertically from the top wall 27. Each of the doors 61 may include a lock 74 to retain the doors 61 in the closed position.

A pair of mounts 62 is provided and each of the doors 61 has one of the mounts 62 attached to it. A plate 63 is removably positionable in each of the mounts 62 so that the plate 63 extends horizontally between the doors 61 when the doors 61 are positioned in a vertical orientation to expose the cooking aperture 37. The plate 63 may abut the grill 60 when the plate 63 is positioned in the mounts 62.

As illustrated in FIGS. 1, 3, 4, 5 and 8, generally, the gate 26 may be removed from the box 12. A plurality of legs 64 each has a top end 65 and a bottom end 66. Each of the top ends 65 is removably insertable into corresponding ones of the leg wells 42 to support the gate 26 when the gate 26 is removed from the box 12 so that each of the bottom ends 66 engages a support surface 67. A plurality of magnets 68 may be attached to each of the top ends 65 to magnetically retain each of the top ends 65 in the leg wells 42.

A lid 69 is hingedly coupled to the gate 26. The lid 69 is selectively positionable in a covering position to completely cover the top wall 27. The lid 69 is selectively positionable in an exposing position to expose the top wall 27. A retainer 70 may be mounted on the top wall 27. A clasp 75 may be attached to the lid 69. The clasp 75 may engage the retainer 70 to retain the lid 69 in the covering position.

An access cover 71 may be hingedly coupled to the top wall 27 to cover said access aperture 38. A hose cover 72 may be hingedly coupled to the top wall 27 to cover the hose aperture 39. A catch 73 may be attached to each of the access 71 and hose 72 covers. The catch 73 retains each of the access 71 and hose 72 covers on the respective access 38 and hose 39 apertures.

A handle 76 is rotatably coupled to the bottom wall 28. The handle 76 is mechanically coupled to each of the latches 36 and may be actuated to selectively release each of the latches 36 from each of the latch retainers 25. The handle 76 may be actuated to position the gate 26 in the open position.

In use, the handle 76 is actuated to position the gate 26 in the open position and the lid is positioned in the exposing position. Each of the doors 61 are positioned to expose the grill 60 and the plate 63 inserted into each of the mounts 62. The hose 54 is then extended out of the hose aperture 39 and the coupler 57 attached to the fuel container 59. Once set up, the assembly 10 may then be used as a conventional grill and when not in use will function as a tailgate.

The tool 53 may be used to position the shutoff valve 52 in the on position to direct fuel to the control valve 49. The control valve 49 may be actuated to the open position to direct fuel to the burner 48. The gate 26 may be removed from the box 12. Each of the legs 64 may be positioned in the leg wells 42 so the magnets 68 magnetically engage the gate 26. The gate may be positioned so the bottom ends 66 each engage the support surface 67.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An outdoor cooking assembly configured for cooking on a vehicle, said assembly comprising:
   a pickup truck including;
      a box having a basal wall and an exterior wall attached to and extending vertically from said basal wall, said exterior wall including a first lateral wall, a second lateral wall and a cab wall, an end of each of said first and second lateral walls defining an opening on a rear end of said box;
   a gate having a top wall, a bottom wall and a perimeter wall extending between said top and bottom walls, said gate being rotatably coupled to each of said first and second lateral walls, said gate being selectively positionable in a closed position to close said opening, said gate being selectively positionable in a open position to expose said opening and having said top wall being in a generally horizontal orientation, said top wall having a cooking aperture extending therethrough to access an interior of said gate, said top wall having an access aperture extending therethrough, said top wall having a hose aperture extending therethrough, said perimeter wall having a control aperture extending therethrough, said perimeter wall having a valve aperture extending therethrough, said bottom wall having a plurality of leg wells extending into the compartment;

a pan being positioned within the interior of said gate, said pan having a lower wall and a peripheral wall being attached to and extending upwardly from said lower wall, said peripheral wall including an upper edge, said upper edge being attached to and being coextensive with an edge of said cooking aperture;

a burner being positioned in said pan;

a control valve being in fluid communication with said burner, said control valve being configured to be fluidly coupled to a fuel supply for supplying fuel to said burner, said valve being positioned in the interior of said gate and including a grip being accessible through said control aperture, said control valve being actuated to control fuel flow to said burner;

a fuel conduit being in fluid communication with said control valve and supplying fuel to said burner when said control valve is actuated to an open position;

a shutoff valve being in fluid communication with said fuel conduit, said shutoff valve being positionable in an off position to restrict flow of fuel to said control valve or in an open position to allow flow of fuel to said control valve, said shutoff valve being positioned within the interior of said gate and being accessible through said valve aperture;

a hose being in fluid communication with said shutoff valve, said hose having a first end and a second end, said first end comprising a coupler, said second end being attached to said shutoff valve, said hose being extendable out of said hose aperture and being selectively connected to and being in fluid communication with an outlet of a fuel container to supply the fuel to said burner, said hose being comprised of a flexible and air impermeable material;

a grill being removably positioned over and completely covering said cooking aperture to provide a cooking surface;

a pair of doors each being hingedly coupled to said top wall, each of said doors being selectively positionable to close said cooking aperture, each of said doors being selectively positionable to expose said cooking aperture having each of said doors extending vertically from said top wall;

a pair of mounts, each of said doors having one of said mounts attached thereto;

a plate being removably positionable in each of said mounts such that said plate extends between said doors when each of said doors are positioned in a vertical orientation to expose said cooking aperture;

a plurality of legs each having a top end and a bottom end, each of said top ends being removably insertable into corresponding ones of said leg wells to support said gate in said open position and having each of said bottom ends engaging a support surface; and a lid being hingedly coupled to said gate, said lid being selectively positionable in a covering position to completely cover said top wall, said lid being selectively positionable in an exposing position to expose said top wall, said lid being positioned to block said opening on said rear end of said box when said lid is positioned in said exposing position.

* * * * *